United States Patent
Karlsson (10) Patent No.: US 8,819,135 B2
(45) Date of Patent: Aug. 26, 2014

(54) METHOD OF PERFORMING DATA MEDIATION, AND AN ASSOCIATED COMPUTER PROGRAM PRODUCT, DATA MEDIATION DEVICE AND INFORMATION SYSTEM

(75) Inventor: Pär Karlsson, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 277 days.

(21) Appl. No.: 13/001,014

(22) PCT Filed: Jun. 24, 2009

(86) PCT No.: PCT/EP2009/057860
§ 371 (c)(1),
(2), (4) Date: Dec. 22, 2010

(87) PCT Pub. No.: WO2009/156418
PCT Pub. Date: Dec. 30, 2009

(65) Prior Publication Data
US 2011/0125848 A1    May 26, 2011

(30) Foreign Application Priority Data
Jun. 26, 2008    (EP) ..................... 08159119

(51) Int. Cl.
*G06F 15/16* (2006.01)
(52) U.S. Cl.
USPC .......................................... 709/204; 709/230
(58) Field of Classification Search
USPC ..................... 709/100, 204, 228, 231, 246
See application file for complete search history.

(56) References Cited

U.S. PATENT DOCUMENTS 7,353,296 B2 * 4/2008 Nuuttila ................... 709/246
2002/0141449 A1 * 10/2002 Johnson ................... 370/473

(Continued)

FOREIGN PATENT DOCUMENTS

EP    1816562 A1    8/2007
EP    2026258 A1 * 2/2009 ............. G06Q 10/00

OTHER PUBLICATIONS

IBM. (Jan. 18, 2007). High performance, zero copy, low latency interprocess communication channel. IBM Technical Disclosure Bulletin. Retrieved from http://www.ip.com/pubview/IPCOM000145600D.*

(Continued)

*Primary Examiner* — Lynn Feild
*Assistant Examiner* — Timothy Sowa
(74) *Attorney, Agent, or Firm* — Myers Bigel Sibley & Sajovec, PA (57) ABSTRACT

A data mediation method involves receiving an incoming data stream from a data communication network; analyzing the incoming data stream to determine an inbound second-format message for transport in the network; processing a part of the inbound second-format message by parsing a selected subset of the message parameters; generating a run-time data structure to represent the parsed message parameters in the selected subset; processing the generated run-time data structure by applying a data mediation logic which defines actions to be taken upon incoming data messages, the actions including adaptation of the generated data structure by modifying any of the message parameters in the selected subset and/or adding new message parameters based on the parsed message parameters; building an outbound second-format message from the inbound second-format message and the generated data structure; and sending the outbound second-format message in an outgoing data stream on the network.

19 Claims, 8 Drawing Sheets

(56) References Cited

U.S. PATENT DOCUMENTS

| | | | |
|---|---|---|---|
| 2002/0161907 A1* | 10/2002 | Moon | 709/230 |
| 2005/0138210 A1 | 6/2005 | Shkvarchuk et al. | |
| 2006/0034167 A1* | 2/2006 | Grice et al. | 370/229 |
| 2008/0148095 A1* | 6/2008 | Perdomo et al. | 714/6 |

OTHER PUBLICATIONS

Levis, Philip. (Oct. 21, 2007). message_t. TinyOS Core Working Group. (6 pp.). Retrieved from http://web.archive.org/web/20071021135113/http://tinyos.net/tinyos-2.x/doc/html/tep111.html.*

Gropp, William, et al. (Mar. 1999). Improving the Performance of MPI Derived Datatypes. In Proceedings of the Third MPI Developer's and User's Conference (6 pp.). MPI Software Technology Press.*

Jovanovic, M., et al. (1999). An overview of reflective memory systems. Concurrency, IEEE, 7(2), 56-64.*

Koop, Matthew, et al. (Sep. 2007). Zero-copy protocol for mpi using infiniband unreliable datagram. In Cluster Computing, 2007 IEEE International Conference on (pp. 179-186). IEEE.*

Kurmann, Christian, et al. (Jun. 2003). Zero-Copy for CORBA-Efficient Communication for Distributed Object Middleware. In Proceedings of the 12th IEEE International Symposium on High Performance Distributed Computing (10 pp.). IEEE Computer Society.*

O'Carroll, Francis, et al. (Jul. 1998). The design and implementation of zero copy MPI using commodity hardware with a high performance network. In Proceedings of the 12th international conference on Supercomputing (pp. 243-250). ACM.*

Wanke, Stephan, et al. (2007). Measurement of the SIP parsing performance in the SIP express router. Dependable and Adaptable Networks and Services, (9 pp.). Institute of Communication Networks and Computer Engineering, University of Stuttgart.*

Janak, Jan, et al. (2002). SIP Express Router v0.8.8—Developer's Guide. Retrieved from http://ftp.iptel.org/pub/ser/0.8.8/doc/serdev-0.8.8.pdf.*

International Search Report for PCT/EP2009/057860, dated Oct. 1, 2009.

International Preliminary Report on Patentability for PCT/EP2009/057860, dated Sep. 24, 2010.

Chinese Second Office Action Corresponding to Chinese Patent Application No. 200980124015.6; Issuing Date: Dec. 24, 2013; 4 Pages.

Chinese First Office Action Corresponding to Chinese Patent Application No. 200980124015.6; Issuing Date: Apr. 11, 2013; 5 Pages.

* cited by examiner

METHOD OF PERFORMING DATA MEDIATION, AND AN ASSOCIATED COMPUTER PROGRAM PRODUCT, DATA MEDIATION DEVICE AND INFORMATION SYSTEM

CROSS REFERENCE TO RELATED APPLICATIONS

This application is a 35 U.S.C. §371 national stage application of PCT International Application No. PCT/EP2009/057860, filed on Jun. 24, 2009, which claims the benefit of EPO Application No. 08159119.0, filed on Jun. 26, 2008, the disclosures and contents of which are incorporated by reference herein in their entireties. The above-referenced PCT International Application was published in the English language as International Publication No. WO 2009/156418 on Dec. 30, 2009.

TECHNICAL FIELD

The present invention relates to data communication, and in particular to a method of performing data mediation in a data communication network capable of conveying data messages representing requests for data services provided by one or more distributed data resources, and responses to such requests when applicable, the requests being expressed in a first format for data access, said first format defining a plurality of message parameters, and the data messages being encoded into a second format for transport in the data communication network. The invention also relates to an associated computer program product, data mediation device and information system.

BACKGROUND

Complex information system environments often involve different data models between the requesting side which requests information or functionality, and the responding side which responds with information or performs requested functionality. Moreover, the responding side in such complex environments often includes a plurality of data resources, which may be distributed both in a scale-out sense (data concerning different entities being distributed across several instances of one and the same type of directory) and in an information tree distribution sense (different types of information being located in different types of directories). In such complex information system environments it is necessary to include some sort of data mediation in the information system to allow communication between the requesting side and the responding side.

Commonly, complex information systems can be found in mobile tele-communications system like GSM, UMTS, D-AMPS, CDMA2000, FOMA or TD-SCDMA, and in particular the directory services which are required in order to administrate various subscriber data and transactions in the system. Directory services for mobile telecommunication will be used in the remainder of this document as a non-limiting example of an environment in which the present invention may be exercised.

The home location register (HLR) and the home subscriber server (HSS) are two examples of subscriber directories. It is currently believed that for future mobile telecommunication system architectures, such as fourth generation or beyond, there will be a partitioning of the subscriber directories, such as HLR or HSS, into "dataless" front-end devices, which control traffic and signaling but contain no telecom directory data, and a separate generic data layer implemented by directory services based on for instance the lightweight directory access protocol (LDAP). The size of such directories may be enormous, encompassing up to many tens of millions of subscribers, each being identified by several identifiers, and a total throughput of the order of 100,000 transactions per seconds, with permitted latency being limited to a few milliseconds. Because of the size, the data layer will have to be scaled out across many implementing data resources (e.g. LDAP directory servers) and also geographically. Data mediation becomes a critical task in such a complex and large environment.

Data messages which represent requests for data services are typically expressed by the requestor (such as a software application) in a first format for data access. The first format for data access follows a predefined syntax and includes a plurality of message parameters, the purpose of which is to contain the data necessary to specify the requested data service. Once created, the data message is then encoded into a second format for transport. The second format is such that the encoded data message can be conveniently transmitted onto a data communication network included in the information system. When the data resources which provide the requested data services are LDAP directory servers, the first format for data access is thus LDAP. A predefined standard notation known as abstract syntax notation one (ASN.1) is then used together with associated encoding rules, such as basic encoding rules (BER), to encode an LDAP-formatted data message into the second, binary format suitable for transport.

Figure 1:
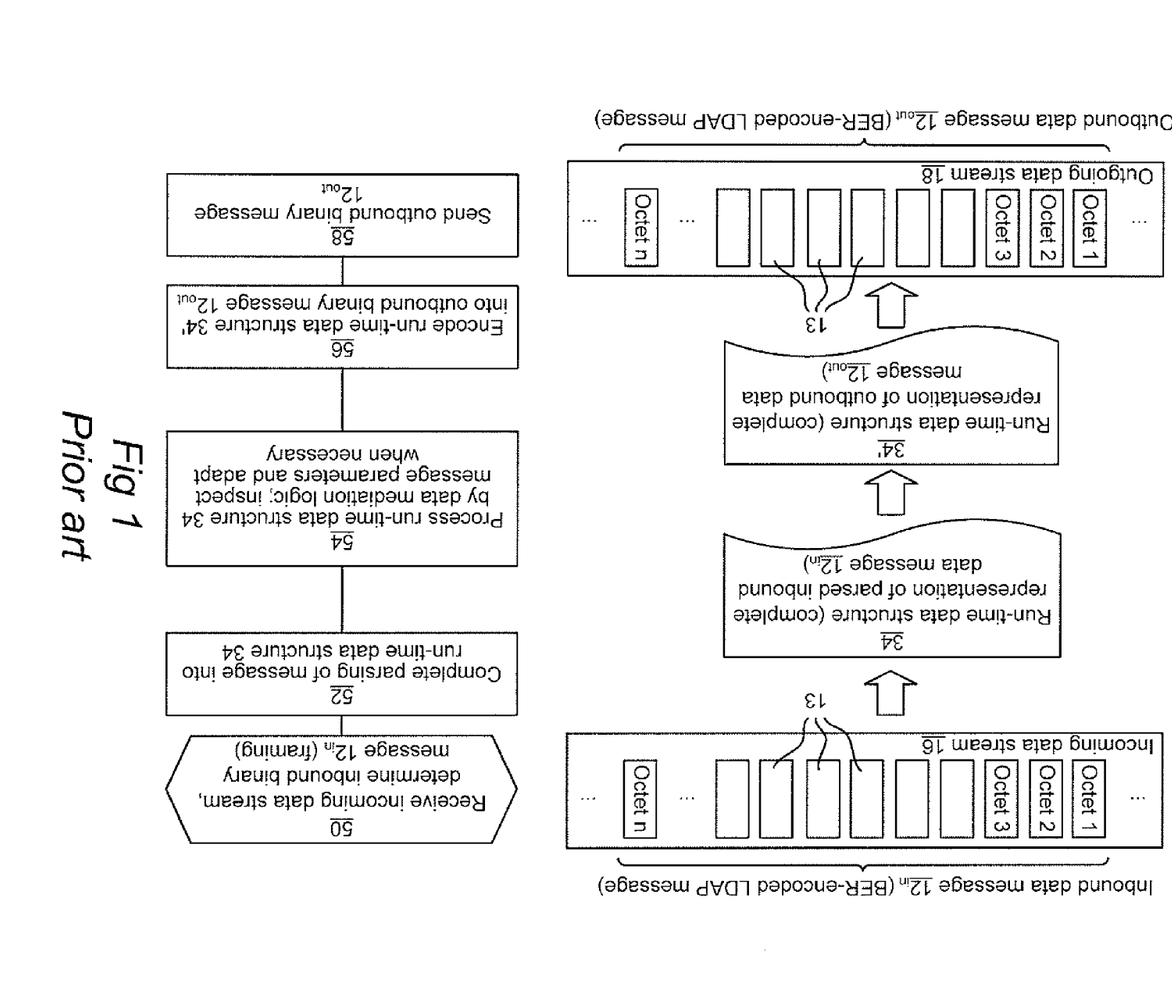
FIG. 1 is a schematic illustration of a prior art approach of performing data mediation in a complex information system.

FIG. 1 illustrates a prior art approach of performing data mediation in a mobile telecommunication system using LDAP-based directory services. An incoming data stream 16 is received from a data communication network by a data mediator in a step 50. The data stream 16 is analyzed so as to determine a complete inbound data message $12_{in}$ (a procedure known as framing). The inbound data message $12_{in}$ is a BER-encoded binary representation of an LDAP message as created in the first format for data access by a requestor, representing e.g. a request for a data service provided by any of a plurality of data resources in the form of LDAP directory servers, and encoded into its second format for transport in the form of a sequence of octets 13. The LDAP message (in its first format) contains a plurality of message parameters. In a step 52, the inbound data message $12_{in}$ is parsed for every message parameter by parsing functionality in the data mediator. As the message parameters are parsed, a high-level representation of each parsed parameter is created in e.g. the form of a data object, record or data variable. Thus, a run-time data structure 34 is created in step 52 as a complete representation of the inbound data message $12_{in}$ with its message parameters. No further use is made of the inbound data message $12_{in}$, as stored at the reception thereof in a memory of the data mediator.

In a step 54, a data mediation logic is executed by the data mediator. This involves processing the created run-time data structure 34 with the parsed message parameters to inspect the message parameters which are of particular interest for the data mediation task at hand, and adapting the message parameters if necessary for the subsequent travel of the data message towards its destination at the receiving side. Adapting the message parameters involves modifying the run-time data structure 34 into a modified version 34', reflecting any changed, deleted or added message parameters as produced by the data mediation logic during step 54. This may in some cases involve copying of the entire run-time data structure 34 into a copy 34'.

Once the data mediation logic has finished processing the run-time data structure 34/34' in step 54, the data mediator builds in step 56 a new outbound data message $12_{out}$ from scratch, by encoding the processed run-time data structure 34' into the second format for transport. The thus generated outbound data message $12_{out}$ is finally sent in an outgoing data stream 18 on the data communication network.

Whereas the prior art approach referred to above is believed to fulfill its purposes when it comes to performing data mediation as such, the present inventor has identified performance problems with this approach, since it is neither efficient in memory usage, nor in processing cost. A resulting penalty is that the latency between requests and responses in the information system can rise to unacceptable levels.

Therefore, there is a need for improvements in the way data mediation is performed in complex information systems.

SUMMARY

It is accordingly an object of the invention to eliminate or alleviate at least some of the problems referred to above.

As a conceptual idea behind the invention, the present inventor has realized that the complete parsing of all message parameters of an inbound data message into a complete run-time data structure can be avoided by carefully selecting only a subset of the message parameters for parsing and thus only generating a limited run-time data structure, representing only the parsed parameters in the selected subset. Improvements in processing time as well as memory handling are made available thanks to this insight by the inventor.

This conceptual idea has been reduced to practice at least according to the aspects and embodiments of the invention referred to below.

One aspect of the present invention therefore is a method of performing data mediation in a data communication network, the network being capable of conveying data messages representing requests for data services provided by one or more distributed data resources, and responses to such requests when applicable, the requests being expressed in a first format for data access, said first format defining a plurality of message parameters, and the data messages being encoded into a second format for transport in the data communication network, the method involving:

receiving an incoming data stream from said data communication network;

analyzing the incoming data stream to determine an inbound second-format message in said incoming data stream;

processing a part of the inbound second-format message by parsing a selected subset of said plurality of message parameters;

generating a run-time data structure to represent the parsed message parameters in said selected subset;

processing the generated run-time data structure by applying a data mediation logic, said data mediation logic defining actions to be taken upon incoming data messages, said actions including adaptation of the generated data structure if necessary by modifying any of the message parameters in said selected subset and/or adding new message parameters based on the parsed message parameters;

building an outbound second-format message from the inbound second-format message and the generated data structure, as adapted in the step of processing the generated run-time data structure; and sending said outbound second-format message in an outgoing data stream on said data communication network.

This aspect of the invention will provide significant performance gains for data mediation, since inbound messages are not parsed in their entirety. Instead, the parsing is limited to selected message parameters, and the run-time data structure is generated only for these parsed messages. This will allow the mediation logic to be designed in a more compact way, saving both memory space and processing cost. Since the data mediation can be made more efficiently, the latency between requests and responses in the system can be reduced.

The data services are typically provided by a plurality of distributed data resources, wherein the actions defined by said data mediation logic include routing actions to be taken upon incoming data messages so as to direct them to correct ones of the plurality of distributed data resources.

In one or more embodiments, the inbound second-format message is stored in memory in the step of analyzing and kept therein, wherein the step of building the outbound second-format message involves basing the outbound second-format message upon the inbound second-format message as a whole, or parts thereof, as kept in memory. Since—in contrast to the prior art approach—the outbound second-format message is not build from scratch from a run-time data structure representing the entire data message (in the first format for data access) but instead is built directly from the stored inbound second-format message (already being in the second format for transport), the building of the outbound message can be done both quicker and more memory efficient.

For such one or more embodiments, during the step of processing by parsing, pointers to the positions of the parsed message parameters within the inbound second-format message are advantageously set and maintained in said memory to further improve the efficiency of processing and memory handling.

For such one or more embodiments, when—during the step of processing by applying the data mediation logic—a data value of any of the parsed message parameters has been adapted to a new value, the step of building the outbound second-format message involves overwriting the data value, at its originally stored position in said memory, with the new value. Here, beneficial use is made from the pointers to the positions of the parsed message parameters within the inbound second-format message which were previously set and maintained in said memory during the step of processing by parsing.

When—during the step of processing by applying the data mediation logic—a data value of an individual one of the parsed message parameters has been adapted to a new value which requires a different data length than said data value in said second format, the step of building the outbound second-format message may involve:

replacing the data value, at its originally stored position in said memory, with the new value;

updating in said memory a length value of said individual parameter;

handling of the stored inbound second-format message in said memory to accommodate the different data length of said individual parameter; and updating any other length value affected by the adapted individual parameter. Such other length value may for instance be the length value of an encompassing (superior) message parameter, or a total length value of the inbound second-format message.

The handling of the stored inbound second-format message may involve copying or moving the trailing remainder of the stored inbound second-format message to contiguous memory position(s) in the memory in order to maintain the stored inbound second-format message in a continuous memory area of the memory. By maintaining the stored inbound second-format message in a continuous memory area of said memory, i.e. as a single sequence of bytes in the memory, the sending step will be very efficient, since the complete outbound data message can be read from the continuous memory area without any (re)allocating memory operations. As an alternative, however, it is possible instead to allow the stored inbound second-format message to become fragmented into several memory areas in said memory as a result of the aforementioned updating of data value lengths. In such a case, the fragmented pieces of the data message can be picked during the sending step and combined into a single outbound data message in the outgoing data stream.

In one or more embodiments, the method further involves:

determining, at the step of processing by applying the data mediation logic, whether any additional message parameter needs to be parsed; and, if so, parsing at least one additional message parameter, not included in said selected subset of said plurality of message parameters, from an additional part of the inbound second-format message; and processing the at least one additional message parameter.

Thus, according to such one or more embodiments, the processing of an inbound message is divided into two stages: a first, mandatory stage where a selected limited subset of message parameters is always parsed irrespective of the type of message concerned, and a second stage which is only executed when it is determined, by the mediation logic in or after the first stage, that the message concerned is of a particular type, or contains or requests certain data, and therefore needs additional processing. Since the subset of message parameters which are parsed in the first stage is small (only a minimum of parameters) but nevertheless is sufficient for many common message types, if will often be enough to perform the first stage to complete the data mediation, and a particularly efficient data mediation approach is therefore provided.

The step of processing the at least one additional message parameter may involve applying the data mediation logic also to the parsed at least one additional message parameter.

In one or more embodiments, the data services provided by said plurality of distributed data resources may include directory services. The first format for data access may be compliant with the lightweight directory access protocol (LDAP), and the second format for transport may be an encoding format compliant with any of the encoding rules for abstract syntax notation one (ASN.1).

Thus, for such one or more embodiments, the abstract syntax notation one (ASN.1) standard is used together with any of its encoding rules to encode the first-format data messages (LDAP compliant) into the second format for transport. These encoding rules include the basic encoding rules (BER), the canonical encoding rules (CER), the distinguished encoding rules (DER), the xml encoding rules (XER), the packed encoding rules (PER), and the generic string encoding rules (GSER). It is envisaged, however, that other embodiments can be used for data mediation of data messages with other formats for data access than LDAP and/or other formats for transport than the encoding rules of the ASN.1 standard.

In one advantageous embodiment, the directory services implement a data layer of a home location register (HLR) or a home subscriber server (HSS) in a system for mobile telecommunication. Such a system for mobile telecommunication may for instance be compliant with GSM, UMTS, D-AMPS, CDMA2000, FOMA or TD-SCDMA, or with any future standard in the fourth generation or beyond. The invention is believed to be particularly beneficial in future telecommunication system architectures, where the HLR or the HSS is likely to be partitioned into "dataless" front-end devices, which control traffic and signaling but contain no telecom directory data, and a separate generic data layer implemented by LDAP services. In view of the "telecom grade" size of such directories, the data layer will contain gigantic amounts of data and will have to be scaled out across many implementing data resources (LDAP servers) and also geographically. Data mediation becomes a critical task in such an environment, and the considerable improvements in efficiency offered by the invention are believed to be particularly valuable.

In this or another advantageous embodiment, the data services are provided by a plurality of distributed data resources and include at least either messaging services or charging for telecommunication services.

Embodiments of the invention are particularly advantageous for information systems where the data services are provided by a plurality of distributed data resources and involve access to data objects or entities which are distributed over several instances of a directory of a certain type, and/or several directories of different types, and wherein the actions to be taken upon incoming data messages by said data mediation logic serve to form a common point of access to said plurality of distributed data resources for requestors of said data services.

A second aspect of the invention is a computer program product comprising a computer readable medium, having thereon a computer program comprising program instructions, the computer program being loadable into a data-processing unit and adapted to cause the data-processing unit to execute the steps according to the first aspect of the invention when the computer program is run by the data-processing unit.

A third aspect of the invention is a data mediation device for performing data mediation in a data communication network, the network being capable of conveying data messages representing requests for data services provided by one or more distributed data resources, and responses to such requests when applicable, the requests being expressed in a first format for data access, said first format defining a plurality of message parameters, and the data messages being encoded into a second format for transport in the data communication network, the data mediation device comprising:

one or more modules for receiving an incoming data stream from said data communication network and for analyzing the incoming data stream to determine an inbound second-format message in said incoming data stream;

one or more modules for processing a part of the inbound second-format message by parsing a selected subset of said plurality of message parameters and for generating a run-time data structure to represent the parsed message parameters in said selected subset;

one or more modules for processing the generated run-time data structure by applying a data mediation logic, said data mediation logic defining actions to be taken upon incoming data messages, said actions including adaption of the generated data structure if necessary by modifying any of the message parameters in said selected subset and/or adding new message parameters based on the parsed message parameters;

one or more modules for building an outbound second-format message from the inbound second-format message and the generated data structure, as adapted by said one or more modules for processing the generated run-time data structure; and one or more modules for sending said outbound second-format message in an outgoing data stream on said data communication network.

A fourth aspect of the invention is an information system comprising one or more distributed data resources;

a data communication network capable of conveying data messages representing requests for data services provided by said one or more distributed data resources, and responses to such requests when applicable, the requests being expressed in a first format for data access, said first format defining a plurality of message parameters, and the data messages being encoded into a second format for transporting the data communication network; and a data mediation device according to the third aspect of the invention.

Embodiments of the second, third and fourth aspects of the invention may generally have the same or directly corresponding features as any of the features referred to above for the first aspect.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Objects, features and advantages of embodiments of the invention will appear from the following detailed description, reference being made to the accompanying drawings, in which.

DETAILED DESCRIPTION

Embodiments of the invention will be now described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Before turning to a detailed description of the disclosed embodiments, an exemplifying environment in which they may be exercised will now be briefly described with reference to FIG. 2.

Figure 2:
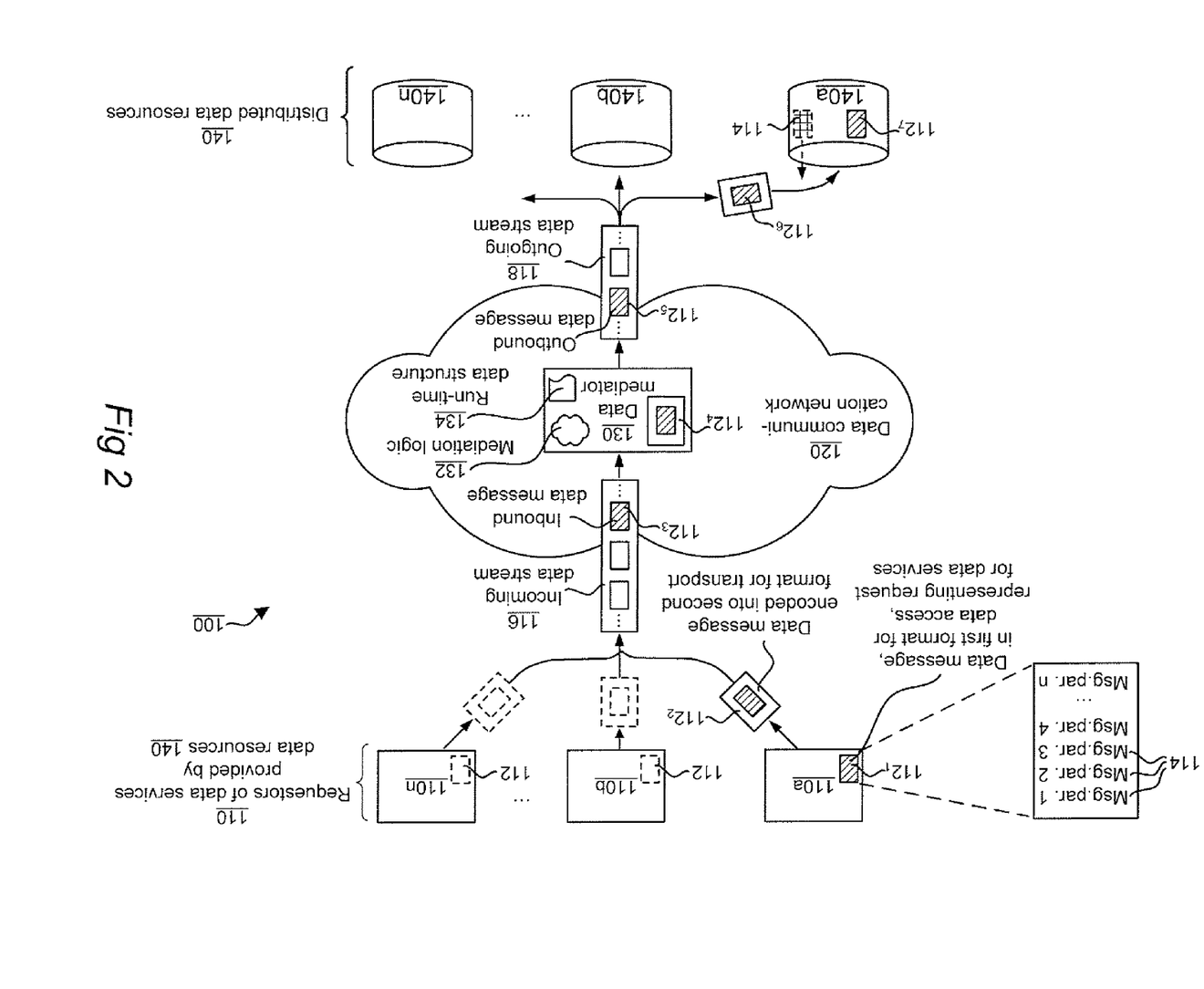
FIG. 2 is a schematic illustration of a non-limiting example of an information system in which embodiments of the present invention may be exercised.

FIG. 2 discloses an information system 100 having a plurality of requestors 110$a$-110$n$ of data services at a requesting side in the system, and one or more, typically a plurality of data resources 140$a$-140$n$ at a responding side in the system. The requestors 110$a$-110$n$, which may be software applications, request information or functionality provided by the plurality of data resources 140$a$-140$n$ by sending data messages 112 which are transported in a data communication network 120, processed by a data mediator 130 and ultimately forwarded to the data resources 140$a$-140$n$. The data mediator 130 serves as a point of access for the requestors 110$a$-110$n$ to the data resources 140$a$-140$n$ and therefore enables communication between the requesting side and the responding side.

When a request is to be made by a requestor 110$a$ (etc), it will create a data message $112_1$ in a first format for data access. The data message has a plurality of message parameters 114 which contain the data necessary to specify the requested data service. Once created, the data message is encoded into a second format for transport, as seen at $112_2$. The second format is such that the encoded data message $112_2$ can be conveniently transmitted onto the data communication network 120.

Thus, encoded data messages from any of the requestors 110$a$-110$n$, including the encoded message from the requestor 110$a$, as seen at $112_3$, will be transported in the communication network 120 and reach the data mediator 130. The data mediator 130 will thus receive an incoming data stream 116, analyze it to determine the inbound second-format message $112_3$ from the requestor 110$a$ in the incoming data stream, and store it in internal memory, as seen at $112_4$.

As will be explained in more detail with reference to the remaining drawings, the data mediator 130 will process a part of the inbound second-format message $112_4$ by parsing a selected subset of the plurality of message parameters 114, and generate a limited run-time data structure 134 to represent the parsed message parameters in the selected subset. The data mediator 130 will then process the generated limited run-time data structure 134 by applying a predefined data mediation logic 132, said data mediation logic defining actions to be taken upon incoming data messages so as to direct them to correct ones of plurality of distributed data resources 140$a$-140$n$, said actions including adaptation of the generated limited data structure 134 if necessary by modifying any of the message parameters in said selected subset and/or adding new message parameters based on the parsed message parameters.

An outbound second-format message $112_5$ will then be built by the data mediator 130 from the inbound second-format message $112_3$, as stored at $112_4$, and the generated limited data structure 134, as adapted if necessary during the processing thereof by the data mediation logic 132. The outbound second-format message will then be sent on the data communication network 120 in an outgoing data stream 118 towards the plurality of data resources 140$a$-140$n$, as seen at $112_6$.

Figure 3:
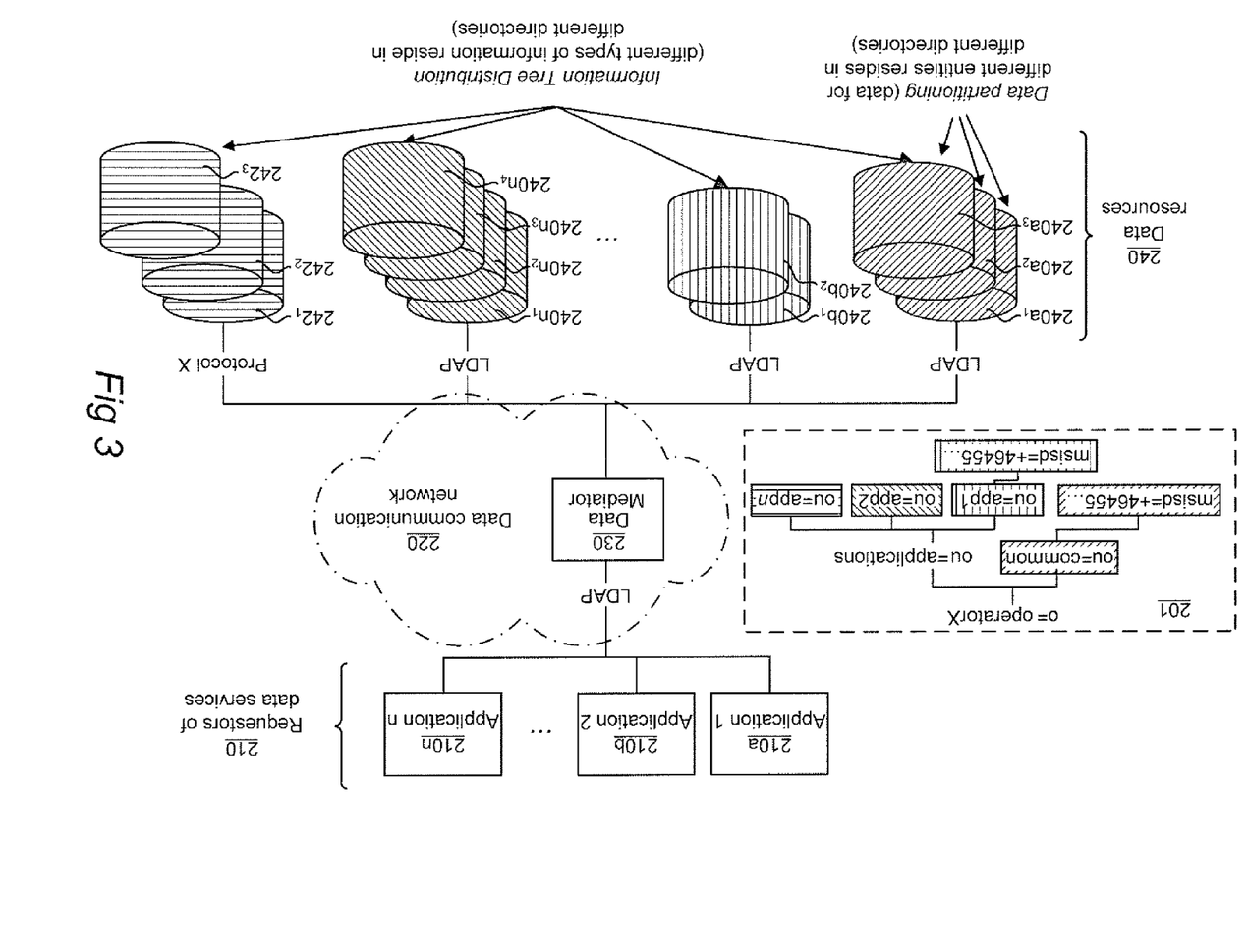
FIG. 3 is a schematic illustration of an information system having a plurality of distributed data resources in the form of LDAP directory servers and a data mediation device according to one embodiment of the invention.

FIG. 3 illustrates an example of a complex information system using LDAP-based directory services, which can be used in a mobile telecommunication system for administrating subscriber-related transactions. As seen in FIG. 3, the responding side, i.e. data resources 240, includes a complex structure of data resources $240a_{1-3}$, $240b_{1-2}$ . . . $240n_{1-4}$, and $242_{1-3}$. Among these, the data resources $240a_{1-3}$, $240b_{1-2}$ . . . $240n_{1-4}$ are LDAP directories, whereas the data resources $242_{1-3}$ are of a different kind, referred to as "Protocol X". The receiver side may, for instance, implement a data layer for a home location register (HLR) and/or a home subscriber server (HSS) in a future mobile telecommunication system architecture, such as fourth generation or beyond. As seen in the drawing, the data resources 240 are distributed both in a scale-out sense (data concerning different objects or entities—such as telecom users—being distributed across several instances of one and the same type of directory (as seen at $240a_{1-3}$)) and in an information tree distribution sense (different types of information being located in different types of directories (i.e. LDAP directories of different kinds, and Protocol X directories)).

The data mediator 230 forms a single point of access to the complex structure of data resources 240 for the requesting applications 210a-210n. The data mediator 230 thus hides the downstream complexity and topology (information and network) of the responding side for the applications 210a-210n. It is schematically illustrated at 201 how the data mediator 230 in effect provides an interface for the applications 210a-210n to a "virtual directory", which is perceived by applications 210a-210n as essentially a single directory but which in reality is implemented by the complex structure of directories $240a_{1-3}$, $240b_{1-2}$ ... $240n_{1-4}$, and $242_{1-3}$.

The size of the directories $240a_{1-3}$, $240b_{1-2}$ ... $240n_{1-4}$, and $242_{1-3}$ may be enormous; encompassing up to many tens of millions of subscribers, each being identified by several identifiers, and a total throughput of the order of 100,000 transactions per seconds. Nevertheless, thanks to an efficient method of performing data mediation according to the invention, processing and memory costs may be reduced, and an acceptable latency between requests and responses can be achieved.

Figure 4:
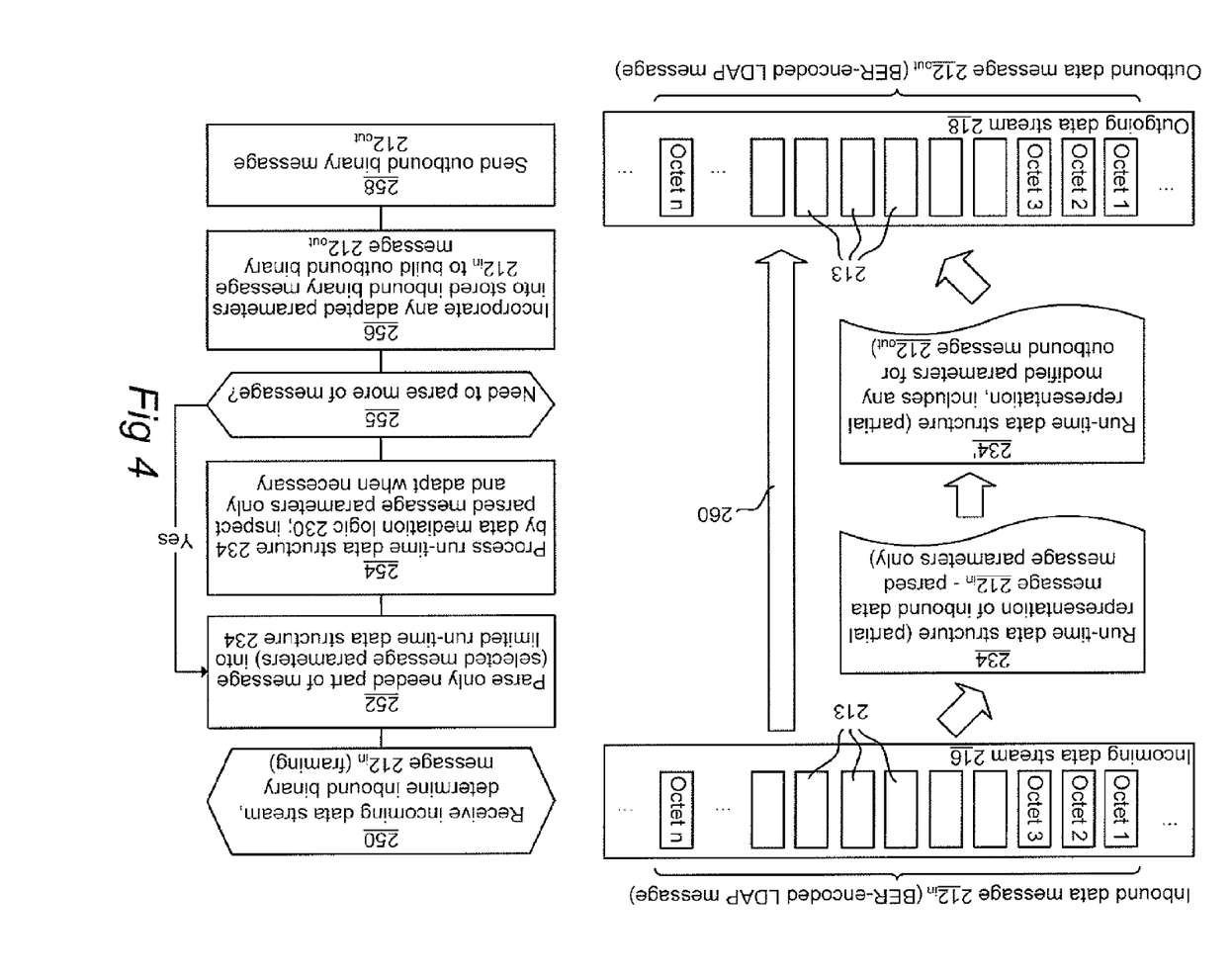
FIGS. 4 and 5 schematically illustrate a method of performing data mediation according to one embodiment of the invention.
Figure 5:
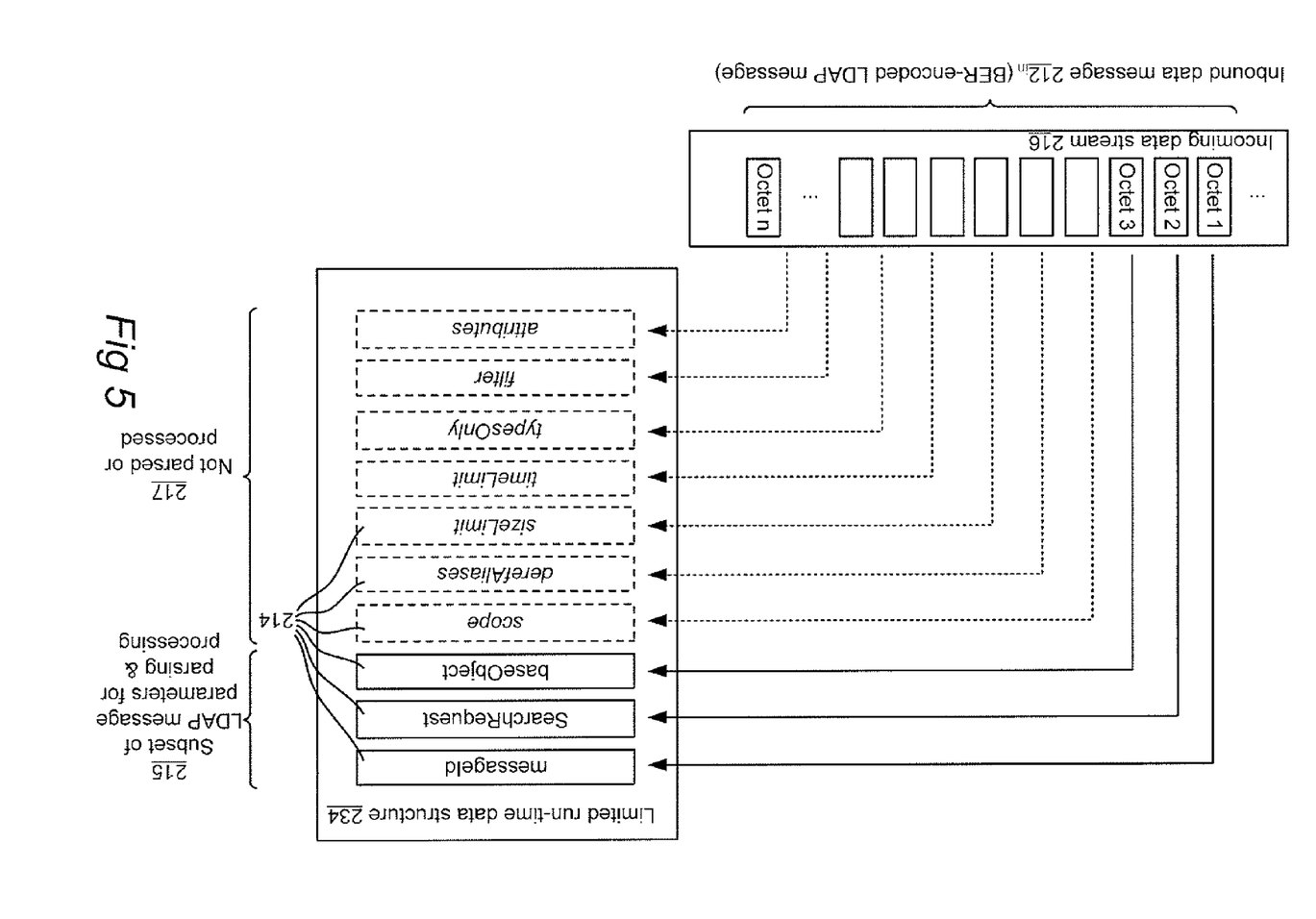

FIGS. 4 and 5 illustrate in more detail the principles of the data mediation according to the invention, when applied to an LDAP to LDAP data mediation scenario like the one shown in FIG. 3. As already mentioned, unlike the prior art, a key feature of the invention is that from a received inbound binary message, only selected parts are actually parsed into a run-time data structure to be readily available as input to the mediation logic. This results in beneficial savings; the parsing must only inspect the binary message up until the point where all needed parameters are found, and the construction of unnecessary data structure, to hold information not actually needed for the data mediation, can be avoided. Further, this results in a reduced need to copy data as well as reduced memory allocation, including garbage collection if applicable.

In FIG. 4, an incoming data stream 216 is received from the data communication network 120, 220 by the data mediator 130, 230 in a step 250. The data stream 216 is analyzed so as to determine, by framing, a complete inbound data message $212_{in}$. The inbound data message $212_{in}$ may be a BER-encoded binary representation of an LDAP message as created in the first format for data access by a requestor (for instance message $112_1$ by requestor 110a in FIG. 2 or by application 210a in FIG. 3), representing e.g. a request for a data service provided by any of the plurality of data resources 140, 240, implemented e.g. as LDAP directory servers. As encoded into its second format for transport, the inbound data message $212_{in}$ contains a sequence of octets 213, which is stored at the reception thereof in a memory of the data mediator 130, 230.

As previously described, the LDAP message (in its first format) contains a plurality of message parameters 114, 214. In a step 252, the data mediator 130, 230 performs parsing of the inbound data message $212_{in}$. More specifically, as is illustrated in FIG. 5, only a subset 215 of the available message parameters 214 are selected for parsing and subsequent processing by the data mediation logic 132. In FIG. 5, the message represents an LDAP SearchRequest, and the selected subset 215 of message parameters contains the messageId, SearchRequest and baseObject parameters, whereas the other parameters 217 of the LDAP SearchRequest are not selected for parsing in step 252. Thus, step 252 acts on only a leading part of the inbound data message $212_{in}$ and parses only the selected subset 215 of its message parameters. As a result, a limited run-time data structure 234 is generated, representing the parsed message parameters only. The limited run-time data structure 234 may be implemented as deemed appropriate by the skilled person, for instance in the form of a set of data objects or data variables representing each parsed parameter, or as a data record representing the subset of parsed message parameters as a whole. Upon completion of step 252, the inbound binary message $212_{in}$ is not discarded, as in the prior art, but is on the contrary kept for subsequent use for efficient building of an outbound binary message $212_{out}$ in a step 256. Therefore, during the parsing in step 252, pointers to the positions of the parsed message parameters within the inbound message $212_{in}$ are set and maintained in the memory to further improve the efficiency of processing and memory handling during the subsequent building step 256.

First, however, the predefined data mediation logic 132 is executed or applied by the data mediator 130, 230 in a step 254. This involves processing the generated limited run-time data structure 234 with its parsed message parameters from the selected subset 215, and adapting the message parameters if necessary for the subsequent travel of the data message towards its destination at the receiving side. Adapting the message parameters may involve modifying the run-time data structure 234 into a modified version 234', reflecting any changed, deleted or added message parameters as produced by the data mediation logic during step 254.

In some cases, the data mediation logic 132 may conclude that the parsed message parameters in the selected subset 215 are not enough for completing the task of the data mediator; therefore, as seen in a step 255, it is determined whether there is a need to parse one or more additional parameters from the inbound message $212_{in}$. If so, step 252 is repeated by parsing an additional part of the inbound message $212_{in}$ in search of the required additional message parameter, and also step 254 is repeated as necessary.

In step 256, the data mediator 130, 230 builds the outbound binary message $212_{out}$ from the stored inbound binary message $212_{in}$, which is already conveniently available in the second (binary) format for transport, as stored in the memory of the data mediator 130, 230. Such reuse of the sequence of octets 213 of the stored inbound binary message $212_{in}$ for the building of the outbound binary message $212_{out}$ is indicated by an arrow 260 in FIG. 4 and represents a processing and memory efficient manner of building the outbound message.

Any adapted message parameters are retrieved from the modified run-time data structure 234' and incorporated into the inbound binary message $212_{in}$ to build the outbound message $212_{out}$. Beneficial use is made from the pointers to the positions of the parsed message parameters within the inbound message $212_{in}$, as set and maintained in memory during the parsing step 252. Depending on the size and scope of the modified message parameters, this procedure can take different forms:

In the simplest cases, it is only a matter of overwriting the actual data value of the modified message parameter, e.g. when changing an integer value and the new value is in the same range as the initial value.

Updating a value that results in a new length of the binary encoded value is somewhat more complex. In this case the change in length needs to be reflected in the encoded message. Typically this means updating a length field for the value itself as well as the length value of any encompassing (superior) message parameter (e.g. the total message length).

This sort of changes will also require copy or move operations of the trailing reminder of the stored inbound message $212_{in}$ to contiguous memory position(s) in the memory in order to maintain the stored inbound second-format message in a continuous memory area of the memory.

By maintaining the stored inbound second-format message $212_{in}$ in a continuous memory area of the memory, i.e. as a single sequence of bytes in the memory, the subsequent sending step 258 will be very efficient, since the complete outbound message $212_{out}$ can be read from the continuous memory area without any (re)allocating memory operations. As an alternative, however, it is possible instead to allow the stored inbound message $212_{in}$ to become fragmented into several memory areas in the memory as a result of the aforementioned updating of data value lengths. In such a case, the fragmented pieces of the data message can be picked during the sending step and combined into a single outbound data message in the outgoing data stream. The latter alternative might be preferable if the messages are of a larger size, but it is noted that in the normal case straightforward copying of byte arrays is an inexpensive and fast operation.

The thus generated outbound data message $212_{out}$ is finally sent in an outgoing data stream 218 on the data communication network 120, 220.

Note that the above description treats the processing of an LDAP message in a general manner, so the same observations apply both to the processing of requests received from the requesting side and responses from the responding side.

A closer look will now be taken at two common LDAP messages, SearchRequest and SearchResultEntry, and how they can be handled by the data mediation described above.

The overall LDAP message structure is defined by the following ASN.1 definition:

```
LDAPMessage ::= SEQUENCE {
        messageID       MessageID,
        protocolOp      CHOICE {
                bindRequest             BindRequest,
                bindResponse            BindResponse,
                unbindRequest           UnbindRequest,
                searchRequest           SearchRequest,
                searchResEntry          SearchResultEntry,
                searchResDone           SearchResultDone,
                searchResRef            SearchResultReference,
                modifyRequest           ModifyRequest,
                modifyResponse          ModifyResponse,
                addRequest              AddRequest,
                addResponse             AddResponse,
                delRequest              DelRequest,
                delResponse             DelResponse,
                modDNRequest            ModifyDNRequest,
                modDNResponse           ModifyDNResponse,
                compareRequest          CompareRequest,
                compareResponse         CompareResponse,
                abandonRequest          AbandonRequest,
                extendedReq             ExtendedRequest,
                extendedResp            ExtendedResponse,
                ...,
                intermediateResponse    IntermediateResponse },
        controls        [0] Control OPTIONAL }
```

As encoded in the second format for transport, the complete length of the message can be derived from the very first bytes of information by the BER coding of the first SEQUENCE. This information is needed to do a proper framing of the request, i.e. to determine when a complete request has been received.

Regarding the messageID that follows it is noted that it potentially can be useful to correlate responses and requests. In many cases the information given by lower network layers (i.e. TCP) is sufficient to do this correlation, though.

In the disclosed embodiment the messageId and the following protocolOp are always parsed and processed. For several of the LDAP messages this actually represents sufficient information to do a proper handling, that is, forwarding the message correctly, updating the internal state held about the LDAP session, detecting certain classes of errors, etc.

An LDAP SearchRequest, defined as follows, requires some further parsing:

```
SearchRequest ::= [APPLICATION 3] SEQUENCE {
        baseObject      LDAPDN,
        scope           ENUMERATED {
                baseObject                      (0),
                singleLevel                     (1),
                wholeSubtree                    (2),
                ... },
        derefAliases    ENUMERATED {
                neverDerefAliases               (0),
                derefInSearching                (1),
                derefFindingBaseObj             (2),
                derefAlways                     (3) },
        sizeLimit       INTEGER (0 .. maxInt),
        timeLimit       INTEGER (0 .. maxInt),
        typesOnly       BOOLEAN,
        filter          Filter,
        attributes      AttributeSelection }
```

The logic that needs to be applied in the handling of a SearchRequest is to route it to the correct downstream directory instance based on what information that is requested. In the normal case the information contained in the baseObject will provide sufficient information to route correctly, and parsing can stop after this parameter.

The potential savings when observing a single request may seem small, but it has to be remembered that this logic will be executed very frequently.

Let us also look at the result of a SearchRequest. The SearchResultEntry corresponds to one entry from the directory and is the result of a match to the parameters of the SearchRequest:

```
SearchResultEntry ::= [APPLICATION 4] SEQUENCE {
        objectName              LDAPDN,
        attributes              PartialAttributeList }
PartialAttributeList ::= SEQUENCE OF
                        partialAttribute PartialAttribute
PartialAttribute ::= SEQUENCE {
        type            AttributeDescription,
        vals            SET OF value AttributeValue }
AttributeDescription ::= LDAPString
                        -- Constrained to <attributedescription>
                        -- [RFC4512]
AttributeValue ::= OCTET STRING
```

Multiple SearchResultEntry items can be returned from a single SearchRequest. The actual status of the search itself is carried in a trailing item called SearchResDone. Since the SearchResultEntry (can) carry all the attributes contained in the matched entry it can 1) contain a lot of attributes, 2) be of quite a significant size. In the HLR case we are talking about up to more than 1000 attributes constituting the whole user profile, with a total size of the order of 10 KB. A straightforward, prior art implementation that would parse all of this data into a large run-time data structure would be likely to additionally consume at least this amount of memory per request—potentially just to put a garbage collector busy if not actually acting upon the attributes themselves. When considering larger attributes (e.g. as in the case of HSS transparent data) the situation will be aggravated even further. Performance tests, which are shown in FIGS. 7 and 8 and which will be reverted to later in this document, have clearly confirmed that large responses has a major impact on performance in tested existing data mediation software from commercial vendors.

Figure 6:
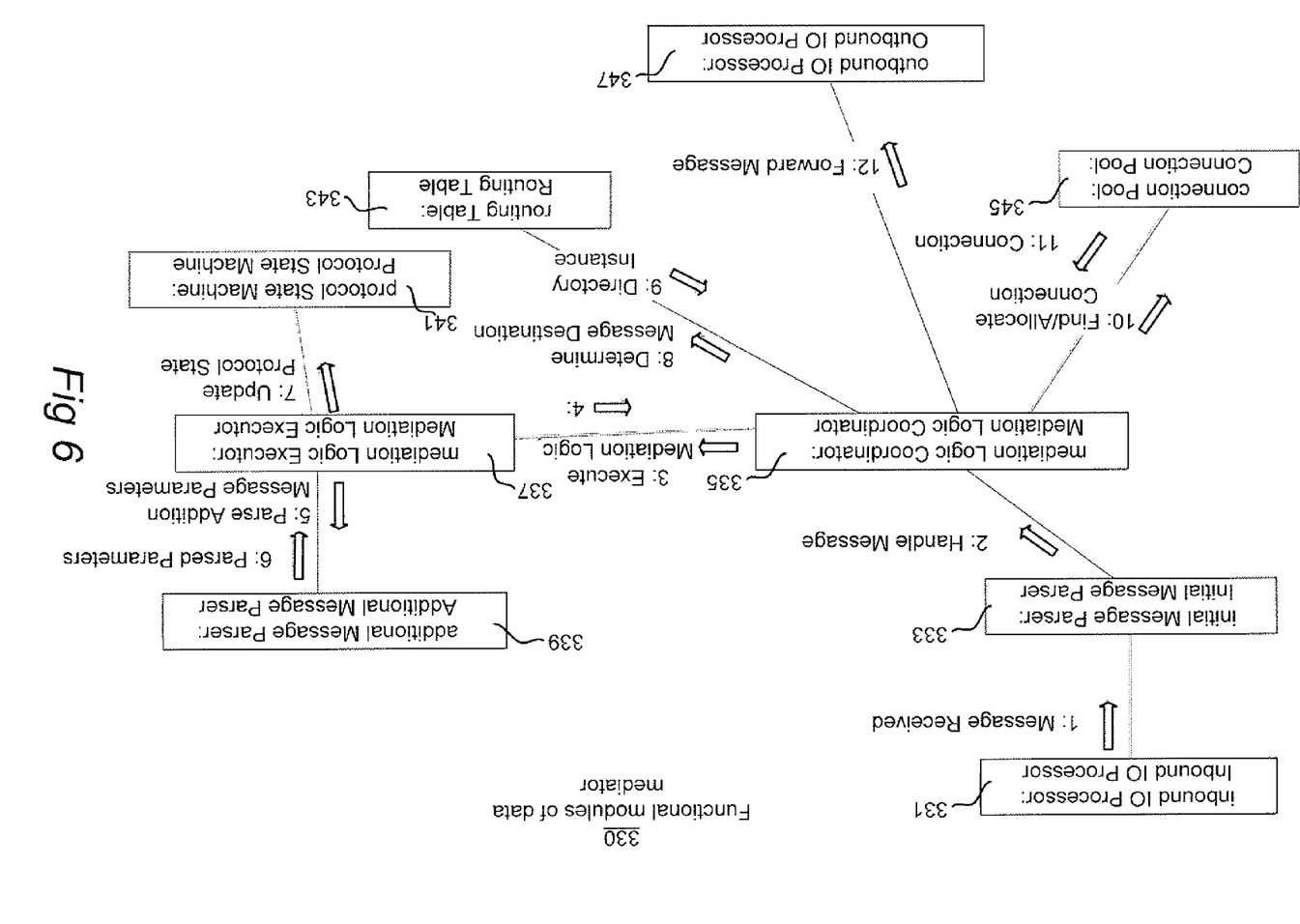
FIG. 6 illustrates the functional modules of a data mediation device according to one embodiment of the invention.

FIG. 6 illustrates the functional modules of a data mediation device 330 according to one embodiment of the invention. Arrows that are numbered from 1 to 12 indicate and describe the flow of activity in the data mediation device 330. The data mediation device 330 may implement the data mediator 130 or 230 according to the preceding drawings. As seen in FIG. 6, the data mediation device 330 comprises an inbound IO Processor module 331 which may handle step 250 of FIG. 4, and an initial Message Parser module 333 which may handle step 252 of FIG. 4. Step 254 of FIG. 4 is handled by a mediation Logic Coordinator module 335 and a mediation Logic Executor module 337, the latter cooperating with an additional Message Parser module 339 (steps 252, 255) and a protocol State Machine module 341.

The mediation Logic Coordinator module 335 also cooperates with a routing Table module 343, a connection Pool module 345 and an outbound IO Processor module 347 which may handle step 258 of FIG. 4 and may involve routing actions so as to direct incoming data messages 112, 212 to correct one(s) of the data resources 140, 240. The functionality of the outbound message-building step 256 of FIG. 4 is performed by the mediation Logic Coordinator module 335 in the embodiment of FIG. 6. In other embodiments it may be implemented as a separate module, or by any of the other modules. In some embodiments, the functionality of the data mediation device 330 required to perform the data mediation method is implemented as a single piece of software rather than modules. Therefore, "modules" shall be construed within the context of the present invention as any means—software-based and/or hardware-based—which can be implemented by one or more persons of ordinary skill to implement the data mediation functionality as taught in the present document. When such functionality is implemented in software, i.e. as one or more computer programs comprising program instructions, the data mediation device 330 will of course also comprise the required pieces of hardware to be able to execute the software and perform the functionality, including a processor or other data-processing unit, work memory, storage memory, internal data buses, network interfaces, etc. The software may be stored in said storage memory and/or on another computer readable medium.

Figure 7:
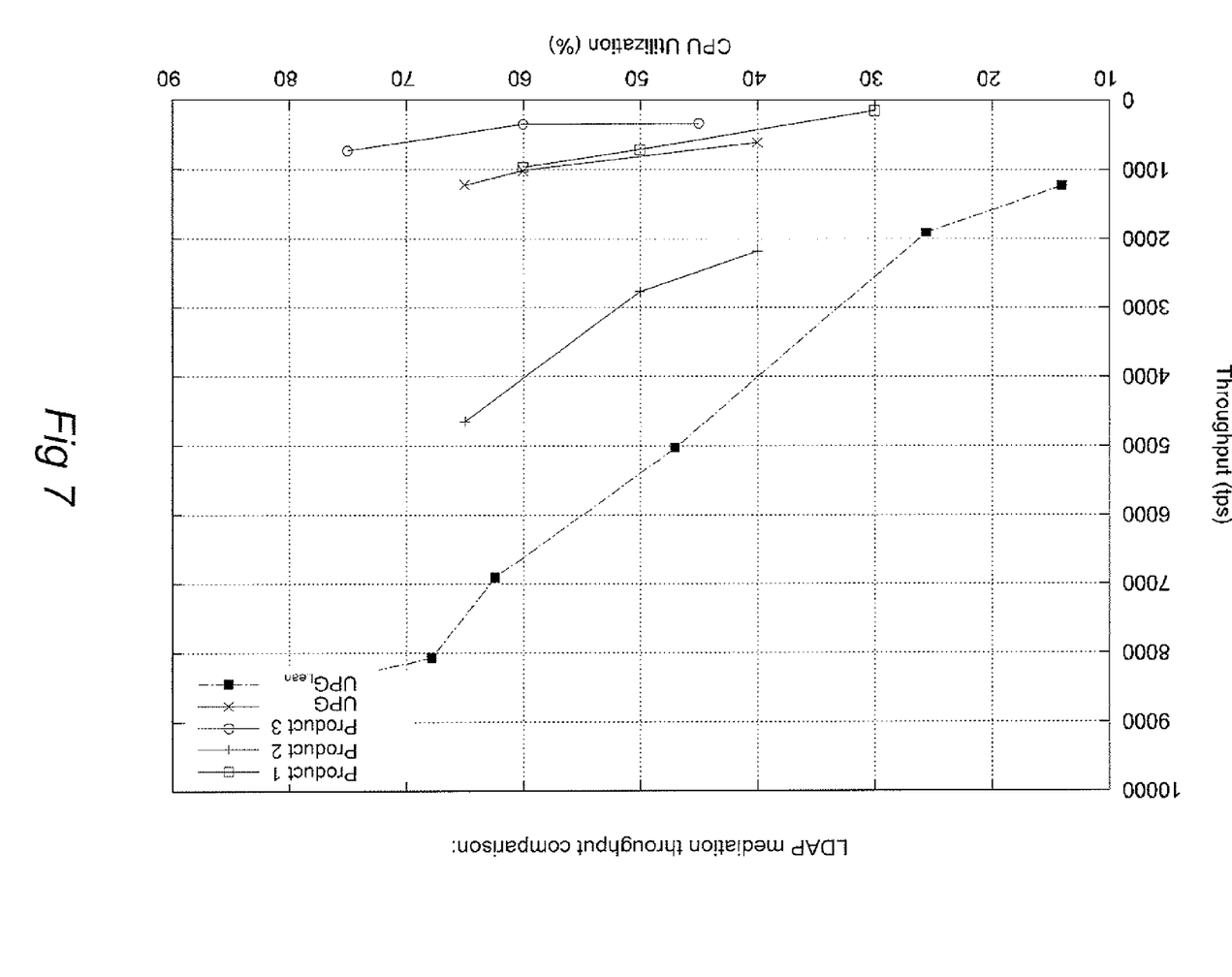
FIGS. 7 and 8 are graphs that illustrate performance tests between an embodiment of the invention and existing data mediation software from commercial vendors.
Figure 8:
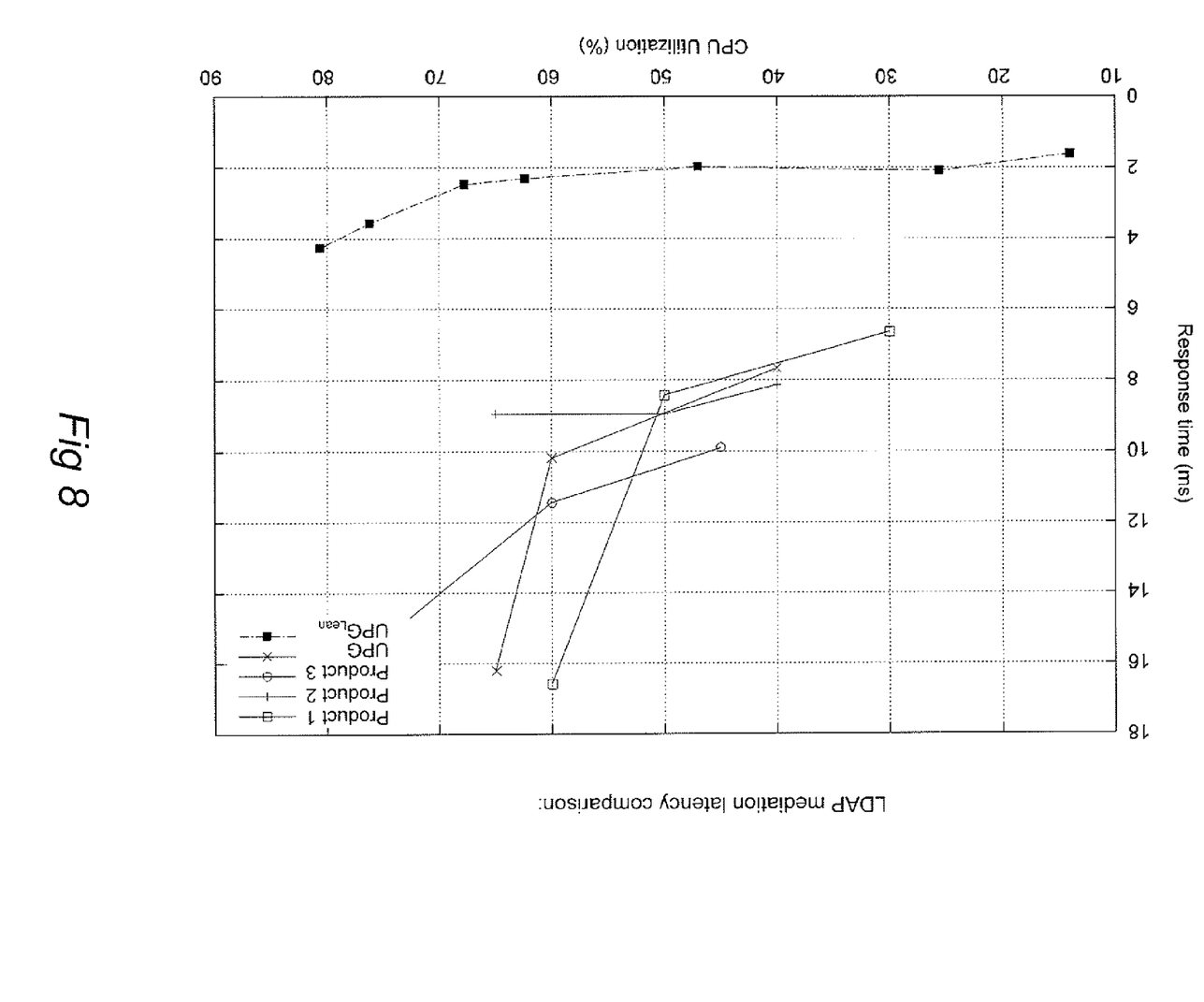

Performance tests between an embodiment of the invention and existing data mediation software from commercial vendors are illustrated by the graphs of FIGS. 7 and 8. An important advantage of the present invention is the performance gains possible in terms of increased efficiency and/or lower processing costs. Four different commercially available data mediation software products, indicated in FIGS. 7 and 8 as "Product 1", "Product 2", "Product 3" and "UPG" (the latter being a data mediation product from the present applicant), were tested against an embodiment of the invention, indicated as "UPG$_{Lean}$" in FIGS. 7 and 8. FIGS. 7 and 8 present throughput and response times (latency) as a function of cpu utilization. The graphs clearly indicate a superior performance in favor of the tested embodiment of the present invention.

The invention has, consequently, been described above with reference to some embodiments thereof. However, as is readily understood by a skilled person, other embodiments are also possible within the scope of the present invention, as defined by the appended claims. In particular, even though the description of the invention has been focused in this document on data mediation in an information system which involves LDAP directory services in mobile telecommunication applications, it is to be emphasized that this shall not be construed as limiting on the invention; the merits of the invention can be utilized also for other data services than directory service, with data messages expressed in other formats than LDAP.

One possible alternative application is the handling of charging for users of accounts (e.g. prepaid accounts or credit accounts) in a telecommunication system. Charging clients in the form of applications delivering end user services may use a known protocol such as Diameter to call upon a data mediator as a single point of access to a hidden downstream structure with a large number of charging servers (tens to hundreds), storing user and account data in a distributed manner. The charging servers will thus host user accounts and offer data services for the charging clients to interact with the accounts, e.g. for deducting money. However, there are several other possible embodiments, within or outside the field of telecommunication systems, that fall within the scope of the invention. Thus, another possible alternative application is the handling of messaging services.

In the disclosed embodiments, a plurality of data resources 140, 240 is provided; other embodiments may however include only one instance of such a data resource 140, 240. Also, embodiments are contemplated where the data mediator 130, with its associated functionality, does not build outbound messages or send them in an outgoing data stream onto the data communication network—for instance in a situation where the server (etc) which implements the data mediator 130 is a terminal node in the network, or at least is configured not to route all received messages further onto the network after the processing steps.

The invention claimed is:

1. A method of performing data mediation in a data communication network capable of conveying data messages representing requests for data services, the requests being expressed in a first format for data access, said first format defining a plurality of message parameters, and the data messages being encoded into a second format for transport in the data communication network, the method comprising:

receiving an incoming data stream from said data communication network;

analyzing the incoming data stream to determine an inbound second-format binary message in said incoming data stream;

processing a part of the inbound second-format binary message by parsing message parameters, the message parameters comprising a selected subset including less than an entirety of said plurality of message parameters;

generating a run-time data structure to represent the parsed message parameters in said selected subset such that the run-time data structure represents less than the entirety of said plurality of message parameters defined by said first format for data access, wherein the inbound second-format binary message is stored in memory and kept therein after generating the run-time data structure;

processing the generated run-time data structure by applying a data mediation logic defining actions to be taken upon incoming data messages, including modifying any of the message parameters in said selected subset and/or adding new message parameters based on the parsed message parameters;

building an outbound second-format binary message from the inbound second-format binary message and the generated run-time data structure by accessing the inbound second-format binary message as stored in memory and reusing at least one same sequence taken therefrom encoded in the second format for transport in the outbound second-format binary message, responsive to processing the generated run-time data structure; and sending said outbound second-format binary message in an outgoing data stream on said data communication network.

2. The method of claim 1, wherein, during the step of processing by parsing, pointers to the positions of the parsed message parameters within the inbound second-format message are set and maintained in said memory, and wherein building the outbound message utilizes the pointers.

3. The method of claim 1, wherein, during the step of processing by applying the data mediation logic, a data value of any of the parsed message parameters is adapted to a new value, and wherein building the outbound second-format binary message comprises:

overwriting the data value, at its originally stored position in said memory, with the new value.

4. The method of claim 1, wherein, during the step of processing by applying the data mediation logic, a data value of an individual one of the parsed message parameters is adapted to a new value which requires a different data length than said data value in said second format, the step of building the outbound second-format message comprises:

replacing the data value, at its originally stored position in said memory, with the new value;

updating in said memory a length value of said individual parameter;

handling of the stored inbound second-format message in said memory to accommodate the different data length of said individual parameter; and updating any other length value affected by the adapted individual parameter.

5. The method of claim 4, wherein the handling of the stored inbound second-format message involves copying or moving the trailing remainder of the stored inbound second-format message to contiguous memory position(s) in said memory in order to maintain said stored inbound second-format message in a single sequence of bytes of said memory.

6. The method of claim 1, further comprising:

determining, at the step of processing by applying the data mediation logic, that at least one additional message parameter needs to be parsed;

parsing the at least one additional message parameter, not included in said selected subset of said plurality of message parameters, from an additional part of the inbound second-format message; and processing the at least one additional message parameter.

7. The method of claim 6, wherein the step of processing the at least one additional message parameter involves applying the data mediation logic also to the parsed at least one additional message parameter.

8. The method of claim 1, wherein the data services provided by said plurality of distributed data resources include directory services.

9. The method of claim 8, wherein said first format for data access is compliant with a lightweight directory access protocol (LDAP).

10. The method of claim 8, wherein said second format for transport is an encoding format compliant with encoding rules for abstract syntax notation one (ASN.1).

11. The method of claim 8, wherein said directory services implement a data layer of a home location register (HLR) or a home subscriber server (HSS) in a system for mobile telecommunication.

12. The method of claim 8, the data services being provided by a plurality of distributed data resources and including at least either messaging services or charging for telecommunication services.

13. The method of claim 1, the data services being provided by a plurality of distributed data resources and involving access to data objects or entities which are distributed over several instances of a directory of a certain type, and/or several directories of different types, and wherein actions to be taken upon incoming data messages by said data mediation logic serve to form a common point of access to said plurality of distributed data resources for requestors of said data services.

14. The method of claim 1, the data services being provided by a plurality of distributed data resources, wherein actions defined by said data mediation logic include routing actions to be taken upon incoming data messages so as to direct them to correct ones of the plurality of distributed data resources.

15. A non-transitory computer program product comprising a computer readable medium, having thereon a computer program comprising program instructions, the computer program being loadable into a data-processing unit and adapted to cause the data-processing unit to execute the steps of claim 1 when the computer program is run by the data-processing unit.

16. A data mediation device in a data communication network capable of conveying data messages representing requests for data services, the requests being expressed in a first format for data access, said first format defining a plurality of message parameters, and the data messages being encoded into a second format for transport in the data communication network, the data mediation device comprising:

at least one processor; and at least one memory coupled to the at least one processor and comprising computer readable program instructions embodied therein that, when executed by the at least one processor, causes the at least one processor to perform operations comprising:

receiving an incoming data stream from said data communication network and analyzing the incoming data stream to determine an inbound second-format binary message in said incoming data stream;

processing a part of the inbound second-format binary message by parsing message parameters, the message parameters comprising a selected subset including less than an entirety of said plurality of message parameters, and generating a run time data structure to represent the parsed message parameters in said selected subset such that the run-time data structure represents less than the entirety of said plurality of message parameters defined by said first format for data access, wherein the inbound second-format binary message is stored in memory and kept therein after generating the run-time data structure;

processing the generated run-time data structure by applying a data mediation logic defining actions to be taken upon incoming data messages including modifying any of the message parameters in said selected subset and/or adding new message parameters based on the parsed message parameters;

building an outbound second-format binary message from the inbound second-format binary message and the generated run-time data structure by accessing the inbound second-format binary message as stored in memory and reusing at least one same sequence taken therefrom encoded in the second format for transport in the outbound second-format binary message, responsive to processing the generated run-time data structure; and sending said outbound second-format binary message in an outgoing data stream on said data communication network.

17. An information system comprising:
one or more distributed data resources;
a data communication network capable of conveying data messages representing requests for data services provided by said one or more distributed data resources and/or responses to such requests, the requests being expressed in a first format for data access, said first format defining a plurality of message parameters, and the data messages being encoded into a second format for transport in the data communication network; and
a data mediation device according to claim 16.

18. The method of claim 1, further comprising:
after generating the run-time data structure, incorporating modified ones of the message parameters of the selected subset into the stored inbound second-format binary message prior to building the outbound second-format binary message therefrom.

19. The data mediation device of claim 16, wherein the at least one memory further comprises computer readable program instructions embodied therein that, when executed by the at least one processor, causes the at least one processor to perform operations comprising:
after generating the run-time data structure, incorporating modified ones of the message parameters of the selected subset into the stored inbound second-format binary message prior to building the outbound second-format binary message therefrom.

* * * * *